United States Patent
Atkins et al.

(10) Patent No.: US 11,525,091 B2
(45) Date of Patent: Dec. 13, 2022

(54) SUPERCRITICAL $CO_2$ SOLVATED PROCESS TO CONVERT COAL TO CARBON FIBERS

(71) Applicant: CARBON HOLDINGS INTELLECTUAL PROPERTIES, LLC, Sheridan, WY (US)

(72) Inventors: Charles Agee Atkins, Sheridan, WY (US); Matthew Targett, Bainbridge Island, WA (US)

(73) Assignee: CARBON HOLDINGS INTELLECTUAL PROPERTIES, LLC, Sheridan, WY (US)

( * ) Notice: Subject to any disclaimer, the term of this patent is extended or adjusted under 35 U.S.C. 154(b) by 0 days.

(21) Appl. No.: 16/827,464

(22) Filed: Mar. 23, 2020

(65) Prior Publication Data
US 2020/0299586 A1 Sep. 24, 2020

Related U.S. Application Data

(60) Provisional application No. 62/821,777, filed on Mar. 21, 2019.

(51) Int. Cl.
*C10C 1/18* (2006.01)

(52) U.S. Cl.
CPC ..................... *C10C 1/18* (2013.01)

(58) Field of Classification Search
None
See application file for complete search history.

(56) References Cited

U.S. PATENT DOCUMENTS

| 4,590,055 A | 5/1986 | Yamada et al. |
| 4,806,228 A | 2/1989 | Beneke et al. |
| 4,840,762 A * | 6/1989 | Sawaki ................ D01F 9/15 |
| | | 264/130 |
| 4,874,502 A * | 10/1989 | Tsuchitani ............. C10C 1/08 |
| | | 208/45 |
| 5,011,594 A | 4/1991 | Haeffner et al. |
| 5,968,435 A | 10/1999 | Kato et al. |

(Continued)

FOREIGN PATENT DOCUMENTS

| JP | S537533 A | 1/1978 |
| JP | S5386717 A | 7/1978 |

(Continued)

OTHER PUBLICATIONS

International Search Report and Written Opinion for International Patent Application No. PCT/US2020/024297 dated Jun. 16, 2020, 10 pages.

(Continued)

*Primary Examiner* — Tam M Nguyen
(74) *Attorney, Agent, or Firm* — Dorsey & Whitney LLP

(57) ABSTRACT

A method of forming high molecular weight ("HMW") coal tar can include combining supercritical carbon dioxide ($sCO_2$) and an amount of coal tar, and fractionating the amount of coal tar to form the HMW coal tar. The method can further include forming the amount of coal tar from coal. Forming the amount of coal tar from coal can include extracting the coal tar from an amount of coal using $sCO_2$.

10 Claims, 3 Drawing Sheets

(56) References Cited

U.S. PATENT DOCUMENTS

| | | | |
|---|---|---|---|
| 2010/0044646 A1* | 2/2010 | Zhamu | B82Y 30/00 |
| | | | 252/511 |
| 2011/0049016 A1 | 3/2011 | Mcgrady et al. | |
| 2011/0082257 A1 | 4/2011 | Carnahan et al. | |
| 2011/0085962 A1 | 4/2011 | Harris et al. | |
| 2012/0097579 A1 | 4/2012 | Stiller et al. | |
| 2015/0076031 A1* | 3/2015 | Zhao | C10G 31/10 |
| | | | 208/40 |
| 2015/0136654 A1* | 5/2015 | Rende | B01J 20/0277 |
| | | | 208/400 |
| 2015/0141701 A1 | 5/2015 | Bedard et al. | |
| 2018/0291275 A1* | 10/2018 | Goodrich | C10B 57/08 |
| 2019/0194022 A1* | 6/2019 | Atkins | C01B 32/16 |
| 2019/0194828 A1* | 6/2019 | Atkins | C01B 32/50 |
| 2020/0299588 A1* | 9/2020 | Goodrich | C10C 3/08 |

FOREIGN PATENT DOCUMENTS

| | | | |
|---|---|---|---|
| JP | S5386718 A | 7/1978 | |
| JP | S54160427 A | 12/1979 | |
| JP | S5558287 A | 4/1980 | |
| JP | S55130809 A | 10/1980 | |
| JP | 4528013 B2 | 6/2010 | |
| JP | 4908634 B2 | 1/2012 | |
| WO | 2010039909 A1 | 4/2010 | |
| WO | 2014153570 A3 | 2/2015 | |
| WO | 2017089585 A1 | 6/2017 | |

OTHER PUBLICATIONS

Yang et al., "Preparation of high-carbon-yield pitches from 1-methylnaphthalene through $I_2O_5$-assisted electrophilic iodination", New Carbon Materials, Jun. 2018, vol. 33, issue 3, pp. 203-212.

* cited by examiner

SUPERCRITICAL CO$_2$ SOLVATED PROCESS TO CONVERT COAL TO CARBON FIBERS

CROSS-REFERENCE TO RELATED APPLICATION

This application claims priority to U.S. Provisional Application No. 62/821,777, filed on Mar. 21, 2019, the disclosure of which is incorporated herein, in its entirety, by this reference.

FIELD

The described embodiments relate generally to carbon based processing methods. More particularly, the present embodiments relate to systems and methods for using a supercritical CO$_2$ solvated process to convert coal to mesophase pitch and carbon fibers.

BACKGROUND

As is well known, for example in U.S. Pat. No. 4,590,055, the carbon fibers currently produced and widely used are classified into two categories according to the starting material, i.e. the PAN (polyacrylonitrile)-based carbon fibers prepared by the carbonization of polyacrylonitrile fibers and the pitch-based carbon fibers prepared from pitches of coal- or petroleum-origin.

Despite the advantages of the pitch-based carbon fibers due to their inexpensiveness, the PAN-based carbon fibers occupy the major current of the industrial high-performance carbon fibers having high mechanical strength and high modulus suitable for reinforcing various composite materials. This is partly due to the tensile strength of the pitch-based carbon fibers being industrially produced being relatively low and limited to 200 kg/mm$^2$ or below.

Various attempts have been made to develop high-performance carbon fibers starting from inexpensive pitch compositions. The properties of the starting pitch is one of the most important factors for obtaining high-performance pitch-based carbon fibers. Recently, several proposals have been made for preparing a pitch composition suitable for forming high-performance carbon fibers, including (a) a method in which a specific condensed polycyclic aromatic compound is subjected to a heat treatment or treatment in hydrogen (see, for example, Japanese Patent Publication Nos. 45-28013 and 49-8634); (b) a method in which a mesophase pitch is obtained by subjecting a tar or pitch of petroleum origin to a first heat treatment in the presence of a Lewis acid catalyst followed by a second heat treatment after removal of the catalyst (see, for example, Japanese Patent Publication No. 53-7533); (c) a method in which a mesophase pitch having a desired mesophase content is obtained by the heat treatment of a pitch in an atmosphere of a flowing inert gas or under a reduced pressure (see, for example, Japanese Patent Kokai Nos. 53-86717 and 53-86718); and (d) a method in which an optically isotropic pitch is subjected to a treatment with an organic solvent, e.g. benzene, toluene, and heptane, and the insoluble fraction is heated to form neomesophase (see, for example, Japanese Pat. Nos. Kokai 54-160427, 55-58287 and 55-130809).

Unfortunately, the above described methods are not effective enough to result in a pitch composition suited for the formation of high-performance carbon fibers having a tensile strength comparable to the PAN-based carbon fibers. Therefore, the actual application of carbon fibers prepared from an isotropic pitch is limited to those fields in which particularly high tensile strength is not required, such as reinforcement in asbestos substitutes. The mesophase pitch produced in some of the above described methods are limited in practical manufacturing processes due to their relatively high viscosity and poor spinnability, causing a difficulty in melt spinning at an economically feasible velocity. Consequently, it is desirable to provide a more economical method for producing coal based mesophase pitch for the production of carbon fibers with sufficiently high tensile strength.

SUMMARY

According to some aspects of the present disclosure, an exemplary method (e.g., a vertically integrated continuous manufacturing method) transforms raw coal feedstock into mesophase pitch which can then be used to form carbon fibers. Related systems are also disclosed. Generally, the methods disclosed herein include forming quality carbon fiber pre-cursor materials, such as mesophase pitch material, from a coal feedstock using one or more supercritical carbon dioxide ("sCO$_2$") solvation methods. An example method includes providing coal tar. Providing the coal tar can include providing preformed coal tar or forming the coal tar directly from coal. Forming the coal tar can include processing coal at elevated temperature thermal pyrolysis conditions to form coal tar aided by sCO$_2$. The method can further include, aided by sCO$_2$, the fractionation of the coal tar to form high molecular weight ("HMW") coal tar. The HMW coal tar includes any coal tar exhibiting a higher molecular weight than the provided coal tar. The HMW coal tar can then be converted to mesophase pitch aided by sCO$_2$. The method can achieve elevated-molecular weight mesophase pitch relative to conventional methods, potentially enabling downstream method simplification, including eliminating the costly and complex carbon fiber stabilization step.

In one example, a method, is disclosed including providing coal tar and fractionating the coal tar to form high molecular weight ("HMW") coal tar with the aid of supercritical carbon dioxide ("sCO$_2$").

In some examples, the method includes providing coal tar including forming the coal tar from coal.

In some examples of the present method, forming the coal tar from coal includes extracting the coal tar from the coal with the aid of sCO$_2$.

In some examples of the present method, fractionating the coal tar to form HMW coal tar includes adding sCO$_2$ and toluene to the coal tar.

In some examples of the present method, fractionating the coal tar to form HMW coal tar includes collecting a toluene insoluble fraction.

In some examples of the present method, fractionating the coal tar to form HMW coal tar includes rinsing the toluene insoluble fraction in toluene.

In some examples of the present method, fractionating the coal tar to form HMW coal tar includes adding quinolone to the coal tar.

In some examples of the present method, fractionating the coal tar to form HMW coal tar includes collecting a quinolone soluble fraction and extracting the HMW coal tar from the quinolone soluble fraction.

In some examples of the present method, fractionating the coal tar to form HMW coal tar includes adding the sCO$_2$ and one or more co-solvents to the coal tar, wherein an amount of the sCO$_2$, by weight, is greater than an amount of the one or more co-solvents.

In some examples of the present method, fractionating the coal tar to form HMW coal tar includes heating the coal tar to a temperature of about 32° C. to about 700° C. and pressurizing the coal tar to a pressure of about 7.5 MPa to about 16 MPa.

In some examples of the present method, the method further includes converting the HMW coal tar into mesophase pitch with the aid of $sCO_2$.

In an example, a method is disclosed including providing coal tar and converting the coal tar into mesophase pitch with the aid of $sCO_2$.

In some examples of the present method, providing coal tar includes providing high molecular weight coal tar.

In some examples of the present method, converting the coal tar into mesophase pitch includes heat treating the coal tar.

In some examples of the present method, heat treating the coal tar includes heating the coal tar to a temperature of about 300° C. to about 500° C.

In some examples of the present method, converting the coal tar into mesophase pitch includes extruding the mesophase pitch into one or more fibers.

In some examples of the present method, the method does not include stabilizing or oxidizing the mesophase pitch after the act of converting the coal tar into mesophase pitch.

In one example, a system is disclosed. The system includes a coal tar source configured to provide coal tar, a HMW coal tar formation apparatus coupled to the coal tar source, a mesophase pitch formation apparatus coupled to the HMW coal tar formation apparatus, at least one $sCO_2$ source coupled to at least the HMW coal tar formation apparatus and the mesophase pitch formation apparatus, and at least one co-solvent source coupled to the HMW coal tar formation apparatus. The at least one $sCO_2$ source can be configured to provide $sCO_2$ to the HMW coal tar formation apparatus and the mesophase pitch formation apparatus. The at least one co-solvent source can be configured to provide at least one co-solvent to the HMW coal tar formation apparatus. The HMW coal tar formation apparatus can be configured to form HMW coal tar from the coal tar using the $sCO_2$ and the at least one co-solvent. The mesophase pitch formation apparatus can be configured to form mesophase pitch from the HMW coal tar using the $sCO_2$.

In some examples of the system, the system further includes a carbon fiber formation apparatus coupled to the mesophase pitch formation apparatus. The carbon fiber formation apparatus can be configured to receive the mesophase pitch from the mesophase pitch formation apparatus and convert the mesophase pitch into carbon fiber. The carbon fiber formation apparatus can be setup without at least one of a fiber formation device, a stabilization device, or a graphitization device.

In some examples of the system, the system further includes a carbon fiber formation apparatus coupled to the mesophase pitch formation apparatus. The carbon fiber formation apparatus can be configured to receive the mesophase pitch from the mesophase pitch formation apparatus and convert the mesophase pitch into carbon fiber. At least one of the coal tar source, the HMW coal tar formation apparatus, the mesophase pitch formation apparatus, the at least one $sCO_2$ source, or the at least one co-solvent source can be a bolt-on retrofit.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
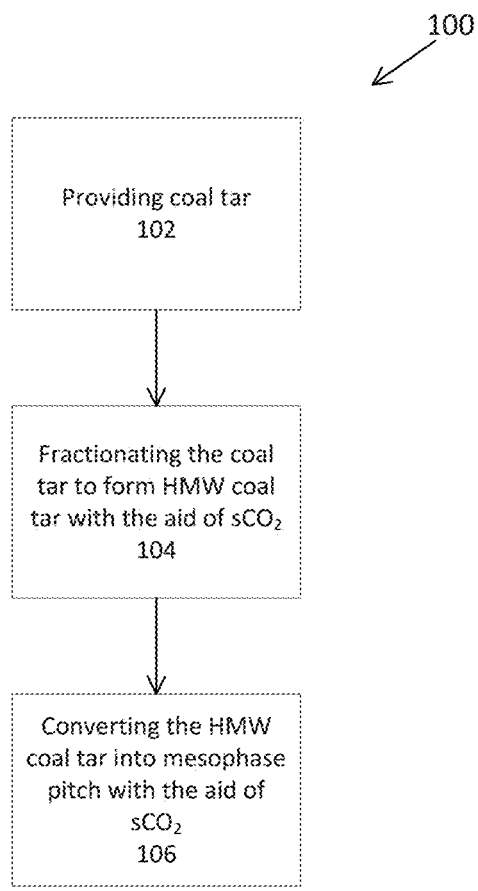
FIG. 1 shows a process flow diagram for a method of forming mesophase pitch.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described can be performed in an order different from that described, and various steps can be added, omitted, or combined. Also, features described with respect to some embodiments can be combined in other embodiments.

According to some aspects of the present disclosure, a method (e.g., a vertically integrated continuous manufacturing method) that transforms raw coal feedstock into mesophase pitch and carbon fibers, and related systems are disclosed. Generally, the methods disclosed herein include forming quality carbon fiber pre-cursor materials, such as mesophase pitch material, from a coal feedstock using one or more supercritical carbon dioxide ("$sCO_2$") solvation methods, as discussed in more detail below. The methods and systems disclosed herein can provide improved quality, yield, and cost advantages relative to traditional methodologies.

An example method includes providing coal tar. Providing the coal tar can include providing preformed coal tar or forming the coal tar from coal. Forming the coal tar can include processing coal at elevated temperature thermal pyrolysis conditions to form coal tar aided by $sCO_2$. The method can further include, aided by $sCO_2$, the fractionation of the coal tar to form high molecular weight ("HMW") coal tar. The HMW coal tar includes any coal tar exhibiting a higher molecular weight than the provided coal tar. The HMW coal tar can then be converted to mesophase pitch aided by $sCO_2$. The method can achieve elevated-molecular weight mesophase pitch relative to conventional methods, potentially enabling downstream method simplification, including eliminating the costly and complex carbon fiber stabilization step.

The methods and systems disclosed can form mesophase pitch from coal. U.S. domestic coal resources are suitable for the formation of high value carbon products, such as carbon fiber. Coal based high performance carbon fiber has higher tensile modulus and electric conductivities than Polyacrylonitrile ("PAN") carbon fiber. Coal tar, a precursor of carbon fiber, is low cost and has a high carbonization yield compared to that of PAN precursor, and could serve as a lower cost precursor. Coal tar from sub-bituminous sources have the hallmark pre-requisite qualities, such as heavy aromatic character, to generate mesophase pitch.

Sub-bituminous coals have been of interest as carbon fiber precursors for some time, but successful attempts of converting sub-bituminous coal tars into suitable mesophase pitches are not widely known nor practiced. For example, the coal needs to be converted to mesophase pitch with a high mesophase content, a high percentage of fixed carbon, and a high fluidity temperature to be useful in the formation of carbon fibers. The general method for producing a high quality and yield of mesophase pitch from coal first involves the removal of low molecular weight species (e.g., quinolone insoluble fractions, fine solids, other pitch solubles, etc.) from the coal tar to form HMW coal tar since such low molecular weight species can interfere with the formation of the mesophase pitch. Conventional methods for removing the low molecular weight species from the coal tar includes distillation, solvent extraction, and certain supercritical fluid extraction (SFE) techniques (e.g., non-$sCO_2$ SFE). SFE is becoming a potential tool to purify coal tar with several distinct advantages over classical isolation methods including speed, low toxicity, and cost.

Second, once the low MW compounds and residual solids have been removed (quinolone insoluble fractions such as coke or ash) from the coal tar, the HMW coal tar (e.g., isotropic matrix) is thermally treated and transformed into a liquid crystal phase including the mesophase pitch. The mesophase pitch has large, graphitic (sheet-like) molecules that layer as sheets in liquid form. Various conventional mesophase formation techniques have been researched with coal-derived pitches and petroleum pitches using thermal treatments at temperatures of about 300° C. to about 500° C. in the presence of solvents, inert gases, and various pressures (e.g., vacuum conditions).

However, conventional methods include several disadvantages. For example, at least some conventional methods can be at least one of, unable to remove a sufficient portion of the low molecular weight species and other contaminants from the coal tar or require significant time. Further, conventional methods of forming mesophase pitch can form mesophase pitch that requires several extraneous methods, such as a stabilization method, preventing direct carbonization of the mesophase pitch into carbon fibers.

The supercritical fluid methods disclosed herein that use $sCO_2$ resolve at least some issues discussed above regarding the conventional methods for forming mesophase pitch from coal. For example, the supercritical fluid methods disclosed herein (either collectively or individually) can form mesophase pitch sufficiently depleted of unwanted low molecular weight species and/or exhibits a sufficiently high molecular weight. For example, the $sCO_2$ can increase the molecular weight of the coal tar and mesophase pitch $sCO_2$ through aromatic ring condensation. The use of the $sCO_2$ can allow for the direct 'carbonization' of the $sCO_2$ solvent-spun fibers (i.e., mesophase pitch formed into fibers)—a significant carbon fiber manufacturing efficiency gain—obviating the need for the costly 'stabilization' step during final fiber spinning and treatment. For example, the stabilization step is complex, costly, and energy consuming and, by some estimates, includes roughly 16% of the baseline carbon fiber spinning costs. Further, the methods disclosed herein includes SFE which is a faster method for removing the low molecular weight species from the coal tar compared to other conventional methods for removing the low molecular weight species. Additionally, using $sCO_2$ in the systems and methods disclosed herein allows for a decreased quantity of co-solvents to be used and facilitates the removal of the co-solvents, both of which decreases the cost of forming the mesophase pitch, makes the method of forming the mesophase pitch quicker and more efficient, and decreases waste formed during the methods disclosed herein.

Further, the methods disclosed herein can include integrating the three primary methods needed in the generation of carbon fiber into a single, continuous method in order to provide the attendant significant cost reductions by reducing some of the most costly steps of carbon fiber processing. For example, the three integrated $sCO_2$-assisted steps for converting coal-to-carbon fibers include, 1) supercritical $sCO_2$ extraction of coal tar from coal, 2) supercritical $sCO_2$ extraction-based refining of coal tar into suitably HMW coal tar, and 3) $sCO_2$-assisted formation of mesophase pitch and solvent-spun fibers.

FIG. 1 is a flow chart of a method 100 of forming mesophase pitch, according to an embodiment. The mesophase pitch formed according to the method 100 can be suitable for forming carbon fiber. As shown in FIG. 1, the method 100 can include act 102, which includes providing coal tar. The method 100 can also include act 104 following act 102, which includes fractionating the coal tar to form HMW coal tar with the aid of $sCO_2$. The method 100 can also include act 106 following act 104, which includes converting the HMW coal tar into mesophase pitch with the aid of $sCO_2$. In some examples, one or more of the acts 102, 104, or 106 can be performed in a different order, eliminated, divided into additional acts, modified, supplemented with other acts, or combined into fewer acts.

Act 102 includes providing coal tar. In an embodiment, act 102 includes providing pre-formed coal tar. In an embodiment, act 102 includes forming (e.g., extracting) coal tar from coal providing the coal tar.

In an embodiment, when act 102 includes forming the coal tar, act 102 can include preparing the coal to have the coal tar extracted therefrom. Preparing the coal can include reducing the particle size of the coal to form a coal powder and/or sieving coal powder, either of which can decrease the time and/or energy required to form the coal tar. Preparing the coal can also include drying the coal to remove moisture therefrom since the moisture can interfere with the efficient transformation of the coal into coal tar. In an embodiment, preparing the coal includes a combination of the above embodiments.

The coal tar can be formed (e.g., extracted) from the coal using any suitable technique. In an embodiment, the coal tar is extracted from the coal using a pyrolysis technique. In such an embodiment, the coal is heated, such as to a temperatures of about 1000° C. to about 2000° C., which can separate the coal into different constituents, such as coke, coal tar, coal gas, and other organic substances. The pyrolyzed coal tar can be distilled (e.g., fractionated) to remove unwanted contaminants therefrom and/or to separate the coal tar into different pitches.

Figure 2:
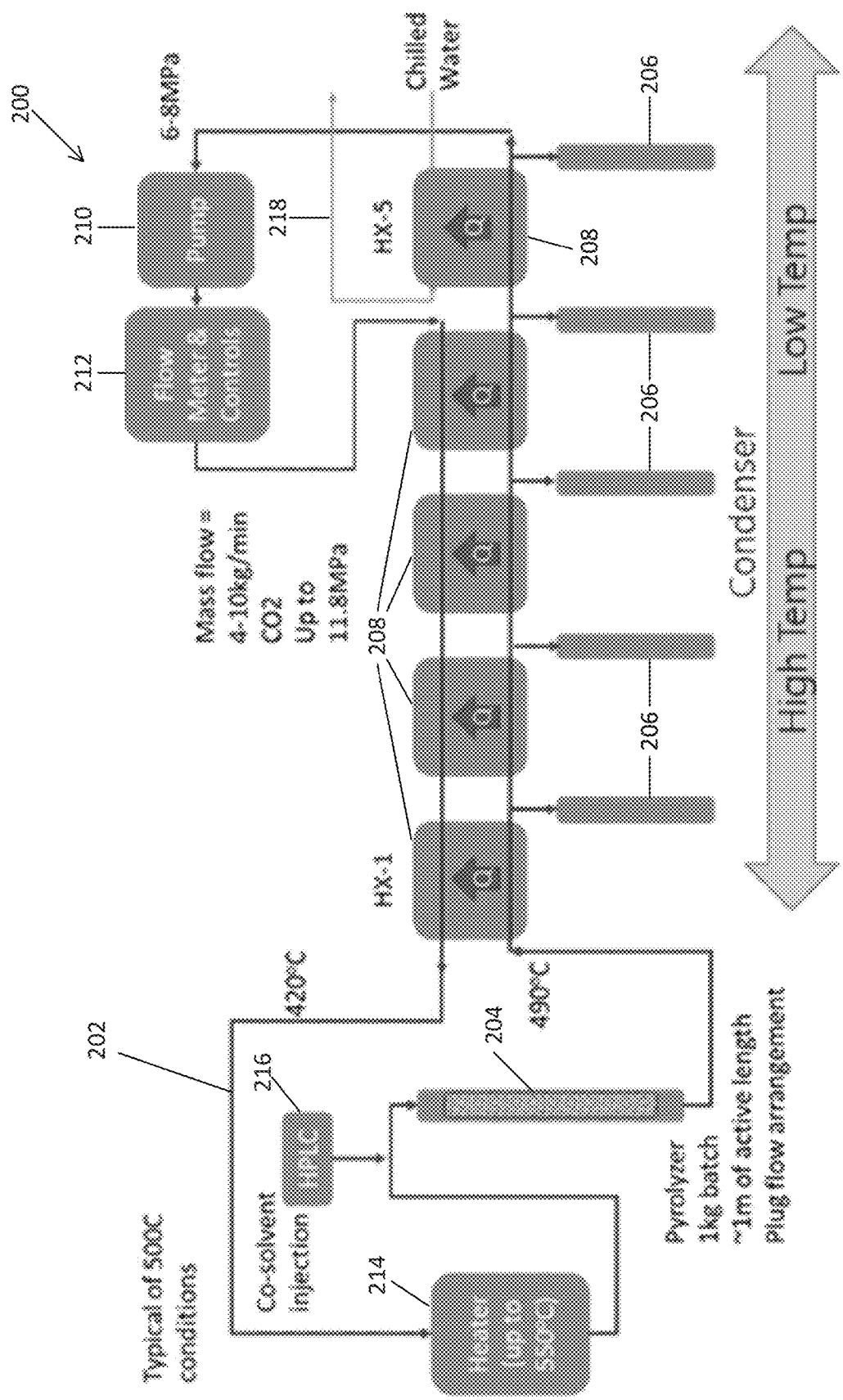
FIG. 2 shows a schematic diagram of a system for extracting coal tar.

In an embodiment, the coal tar is formed from coal aided by $sCO_2$. For example, $sCO_2$ can facilitate the extraction of coal tar from the coal. FIG. 2 is a simplified schematic illustration of a system 200 configured to extract coal tar from coal using $sCO_2$, according to an embodiment. The system 200 is an example of a pyrolysis system that generates and recovers tars from a closed cycle, $sCO_2$ loop and uses pressure to transport condensed pyrolysis tars out of the loop. In an embodiment, the system 200 can be incorporated into an integrated coal to carbon fiber method by transferring the coal tars formed in the system 200 to a $sCO_2$-based solvent fractionation system (discussed in more detail below).

The system 200 includes a flow path 202 (direction of the flow path shown with arrows) for the coal (e.g., coal mixed with $sCO_2$). The system 200 includes a pyrolyzer 204 configured to subject the coal to a pyrolysis method. The system 200 also includes a plurality of condensers 206 and a plurality of recuperative heat exchangers 208 (denoted with a Q inside an arrow to indicate the direction of temperature flow). The condensers 206, with the heat exchangers 208, separate the coal into different components thereof (e.g., char, gas, coal tar, water, etc.), such as separating the coal tar from the other components of the coal and/or separating the coal tar into different types of coal tar (e.g., saturates, aromatics, resins, asphaltenes, solids, etc.). The $sCO_2$ helps the condensers 206 and the heat exchangers 208 separate the coal into the different components thereof allowing a higher percentage of coal tar (e.g., about 5 to about 15% of the coal added into the system 200 can be extracted as coal tar) to be quickly and efficiently extracted from the coal. For example, the coal tar is recoverable from the condensers 206 by cooling the $sCO_2$ and pyrolysis product mix using recuperative heat exchangers 208, akin to reverse distillation. The system 200 also includes other components that regulate the flow rate and temperature of coal. For example, as illustrated, the system 200 can include a pump 210 and a flow meter and control 212 that regulate the flow rate of the coal and the $sCO_2$, and a heater 214 that regulates the temperature of the coal. The system 200 can also include a high-performance liquid chromatography device (HPLC) 216 or other sensors to detect one or more characteristics of the coal and/or coal tar. It is noted that the system 200 can change one or more characteristics of the system 200 (e.g., temperature or flow rate) responsive to characteristics detected by the HPLC 216 or the other sensors. The system 200 can further includes a chiller 218 configured to decrease the temperature of the coal. The system 200 can include one or more additional components not illustrated in FIG. 2, such as an inlet that allows coal (e.g., coal powder) to enter the system 200, an inlet that allows the $sCO_2$ to enter the system (the inlet for the $sCO_2$ can form part of the flow meter and controls 212), one or more outlets that allow the separated components of the coal to be removed from the system 200, one or more filters, or any other suitable components.

FIG. 2 provides the temperature, pressure, and flow rates at different locations of the system 200. However, it is noted that these values are exemplary and the system 200 should not be limited to these values. In one example, FIG. 2 states that the heater 214 can heat the coal to a temperature of up to 550° C. (e.g., about 200° C. to about 300° C., about 250° C. to about 350° C., about 300° C. to about 400° C., about 350° C. to about 450° C., about 400° C. to about 500° C., or about 450° C. to about 550° C.). However, it is noted that the heater 214 can heat the coal to a temperature that is greater than 550° C., such as about 550° C. to about 650° C., about 600° C. to about 700° C., about 650° C. to about 750° C., about 700° C. to about 800° C., about 750° C. to about 850° C., or greater than about 800° C. It is also noted that the temperature can affect the quantities of each type of coal tar extracted from the coal. For example, a high temperature can cause the system 200 to form more resins and asphaltenes than a low temperature, while a low temperature can cause the system to form more saturates and aromatics than a high temperature. The aromatics can be more useful for forming the mesophase pitch. However, it is noted that both the high and low temperatures can form sufficient quantities of aromatics to efficiently form mesophase pitch. The temperature of the coal leaving the heater 214 can be selected based on the flow rate of the coal, how effectively the condensers 206 and the heat exchangers 208 are at separating the coal (e.g., changing the temperature can change the efficacy of the condensers 206 and the heat exchangers 208), and the maximum temperature that the system 200 can safely handle. In one example, FIG. 2 states that the pressure of the coal flowing into the pump 210 is 6 to 8 MPa (e.g., about 6 MPa to about 7 MPa, about 6.5 MPa to about 7.5 MPa, or about 7 MPa to about 8 MPa). However, it is noted that the pressure of the coal flowing into the pump 210 can be less than 6 MPa (e.g., about 5 MPa to about 6 MPa, about 4.5 MPa to about 5.5 MPa, about 4 MPa to about 5 MPa, about 3.5 MPa to about 4.5 MPa, or less than 4 MPa) or greater than 8 MPa (e.g., about 8 MPa to about 9 MPa, about 8.5 MPa to about 9.5 MPa, about 9 MPa to about 10 MPa, about 9.5 MPa to about 10.5 MPa, or greater than about 10 MPa). The pressure of the coal flowing into the pump can be selected based on the flow rate and/or the temperature of the coal flowing into the pump 210 and the maximum pressure that the system 200 can handle. In one example, FIG. 2 states that the mass flow rate of the $sCO_2$ leaving the pump 210 and the flow meter and control 212 is 4 kg/min to 10 kg/min (e.g., about 4 kg/min to about 6 kg/min, about 5 kg/min to about 7 kg/min, about 6 kg/min to about 8 kg/min, about 7 kg/min to about 9 kg/min, or about 8 kg/min to about 10 kg/min). However, it is noted that the mass flow rate of the $sCO_2$ can be less than 4 kg/min (e.g., about 1 kg/min to about 3 kg/min or about 2 kg/min to about 4 kg/min) or greater than about 10 kg/min (e.g., about 10 kg/min to about 12 kg/min, about 11 kg/min to about 13 kg/min, about 12 kg/min to about 14 kg/min, about 13 kg/min to about 15 kg/min, about 14 kg/min to about 16 kg/min, or about 15 kg/min or greater). The mass flow rate of the $sCO_2$ can be selected based on the amount of coal present in the system 200, how effectively the condensers 206 and the heat exchangers 208 are at separating the coal (e.g., changing the mass flow rate of the $sCO_2$ can change the efficacy of the condensers 206 and the heat exchangers 208), and the maximum mass flow rate that the system 200 can safely handle. In an example, FIG. 2 states that the pressure of the coal (e.g., coal and $sCO_2$) leaving the pump 210 and the flow meter and controls 212 can be up to 11.8 MPa (e.g., about 5 MPa to about 7 MPa, about 6 MPa to about 8 MPa, about 7 MPa to about 9 MPa, about 8 MPa to about 10 MPa, about 9 MPa to about 11 MPa, or about 10 MPa to about 11.8 MPa). However, the pressure of the coal leaving the pump 210 and the flow meter and controller 212 can be greater than 11.8 MPa (e.g., about 11.8 MPa to about 14 MPa, about 13 MPa to about 15 MPa, about 14 MPa to about 16 MPa, about 15 MPa to about 17 MPa, about 16 MPa to about 18 MPa, or greater than about 17 MPa). The pressure of the coal leaving the pump 210 and the flow meter and control 212 can be selected based on the mass flow rate of the $sCO_2$, the temperature of the coal leaving the pump 210, the how effectively the condensers 206 and the heat exchangers 208 are at separating the coal (e.g., changing the pressure can change the efficacy of the condensers 206 and the heat exchangers 208), and the maximum pressure that the system 200 can safely handle. In an example, FIG. 2 states that the temperature of the coal entering the heater 210 is 420° C. However, it is noted that the temperature of the coal entering the heater 210 can be less than 420° C. (e.g., about 200° C. to about 300° C., about 250° C. to about 350° C., about 300° C. to about 400° C., or about 350° C. to about 420° C.) or about 420° C. or more (e.g., about 420° C. to about 550° C., about 500° C. to about 600° C., about 550° C. to about 650° C., or about 600° C. or greater). The temperature of the coal entering the heater 214 can depend on how efficiently the heat exchangers 208 transfer heat, how efficiently the heater 214 heats the coal, how effectively the chiller 218 cools the coal, and the maximum temperature that the system 200 can safely handle.

The system 200 uses a $sCO_2$ pyrolysis method that generates valuable solids, liquids, and gases. These liquids are primarily coal tars suitable for transformation to high value mesophase pitch, a precursor to solid carbon products such as electrode material and carbon fiber. The solid pyrolysis product produced is a high-grade char suitable for use in a range of solid carbon structures or as activated carbon. Gases (mainly C1-C4, $H_2$) generated from the method can be used for conversion to $H_2$ or as chemical industry feedstock.

Referring back to FIG. 1, after act 102, the method 100 can include act 104. Act 104 includes fractionating the coal tar to form HMW coal tar with the aid of $sCO_2$. During act 104, the coal tar provided in act 102 is exposed to solvents to remove solids, remove fine chars, remove low molecular weight species, and recover HMW coal tar. The solvents include $sCO_2$ and, optionally, at least one co-solvent (e.g., toluene and/or quinolone). The HMW coal tar collected during act 104 can be the material that was soluble or insoluble in the solvents, depending on the co-solvent. Exposing the coal tar to $sCO_2$ as the primary solvent can avoid energy intensive thermal methods to fractionate the solvent from the coal tar during processing while also avoiding time intensive aspects of liquid phase solvent based separations. The $sCO_2$ also builds the molecular weight of the coal tar to form the HMW coal tar and greatly reduces the amount of co-solvent needed for act 104 compared to a substantially similar act that only used the co-solvent.

After exposing the coal tar to the solvents, the HMW coal tar can be removed from the solvents using any suitable method. In some embodiments, the recovered HMW coal tar can be additionally rinsed in the co-solvent and/or exposed to different solvents (e.g., $sCO_2$ and/or a different co-solvent) to further remove additional contaminants from the HMW coal tar and increase the molecular weight of the HMW coal tar.

In one example, the provided coal tar is heated and pressurized to a selected temperature and pressure. Upon reaching the selected temperature and pressure conditions, $sCO_2$ and co-solvent are flowed at metered rates into the coal tar for a selected period (e.g., about 1 hour or less, about 45 minutes or less, about 30 minutes or less, about 20 minutes or less, about 10 minutes or less, or about 5 minutes or less). When the co-solvent is toluene, the toluene soluble fractions are collected and recovered by the flowing $sCO_2$/co-solvent from the SFE apparatus. The toluene insoluble fraction, which includes the HMW coal tar, can be given an additional toluene rinse for a selected period (e.g., about 2 hours or less, about 1.5 hours or less, about 1 hour or less, about 45 minutes or less, about 30 minutes or less, about 15 minutes or less, or about 5 minutes or less) to remove at least some contaminants that may remain in the HMW coal tar. When the co-solvent is quinolone, the SFE apparatus is cooled and the quinolone soluble fraction is removed. The quinolone soluble fraction includes the HMW coal tar. The HMW coal tar is removed from the quinolone soluble fraction using any suitable method, such as distilling the HMW coal tar from the quinolone soluble fraction using rotary evaporation.

In one embodiment, act 104 includes using two co-solvents sequentially. For example, the provided coal tar can first be exposed to $sCO_2$ and toluene. The toluene insoluble fraction can be collected. Quinolone is then added to the toluene insoluble fraction. The HMW coal tar is removed from the quinolone soluble fraction, for example, using rotary evaporation. Using both toluene and quinolone can remove additional contaminants from the coal tar and can increase the molecular weight of the HMW coal tar since toluene and quinolone can remove different contaminants. For instance, the toluene soluble fraction and the quinolone insoluble fraction can include different contaminants and removing the toluene soluble fraction and the quinolone insoluble fraction can form a HMW coal tar that is the target for the production of anisotropic mesophase pitch ideal for carbon fiber formation/spinning.

As previously discussed, act 104 can include heating and pressurizing the coal tar to a selected temperature and pressure. In one example, the temperature that the coal tar is heated to is about 32° C. to about 75° C., about 50° C. to about 100° C., about 75° C. to about 125° C., about 100° C. to about 150° C., about 125° C. to about 175° C., about 150° C. to about 200° C., about 175° C. to about 250° C., about 200° C. to about 300° C., about 250° C. to about 350° C., about 300° C. to about 400° C., about 350° C. to about 450° C., about 400° C. to about 500° C., about 450° C. to about 600° C., about 500° C. to about 700° C., or about 600° C. or greater. In one example, the pressure that the coal tar it pressurized to is 7.5 MPa to about 8 MPa, about 7.75 MPa to about 9 MPa, about 8 MPa to about 10 MPa, about 9 MPa to about 11 MPa, about 10 MPa to about 12 MPa, about 11 MPa to about 13 MPa, about 12 MPa to about 14 MPa, about 13 MPa to about 15 MPa, about 14 MPa to about 16 MPa, or about 15 MPa or greater. The rate of solvation and condition severity (temperature and pressure) for optimum recovery of high MW pitch fractions suitable for further processing into carbon fiber precursor material depends on the methods used.

Act 104 can be performed using off-the-shelf SFE equipment (e.g., SFT-110 Supercritical Fluid Extractor) or customized SFE equipment. In one embodiment, the SFE equipment used in act 104 is attached to a hopper that includes the provided coal tar or the device (e.g., the condensers 206 of the system 200) that forms the coal tar so the SFE equipment used in act 104 forms part of an integrated assembly line.

It is noted that act 104 can be omitted from the method 100 when the provided coal tar is directly converted into mesophase pitch (e.g., the provided coal tar exhibits a satisfactory molecular weight) or when the method 100 includes providing HMW coal tar.

Act 104 can be followed by act 106. Act 106 includes converting the HMW coal tar into mesophase pitch with the aid of $sCO_2$. The HMW coal tar is converted into mesophase pitch by exposing the HMW coal tar to the $sCO_2$ in a high pressure environment, such as a pressure of about 7.4 MPa or more so the $sCO_2$ remains a supercritical fluid. Preferably, $sCO_2$ is the only solvent that the HMW coal tar is exposed since $sCO_2$ can be easily removed from the HMW coal tar and/or the mesophase pitch. However, it is noted that one or more co-solvents can also be used in act 106 even though the co-solvents can be more difficult to remove from the HMW coal tar and/or the mesophase pitch than the $sCO_2$.

During act 106, a mixture is formed. Initially, the mixture includes the HMW coal tar and $sCO_2$. The HMW mesophase pitch is exposed to the $sCO_2$ in such a manner that a substantial portion of the HMW coal tar comes in contact with the $sCO_2$ (e.g., the HMW coal tar is physically mixed with the $sCO_2$). This allows the $sCO_2$ to dissolve, bond to, or otherwise react with any low molecular weight species that remains in the HMW coal tar. In some examples, the mixture can further comprise one or more catalysts or other chemicals. That is, the coal tar can be combined or mixed with one or more catalysts or other chemicals in addition to the $sCO_2$. In some examples, the mixture can further comprise hydrogen, such as hydrogen gas that is provided with the $CO_2$. Act 106 also forms mesophase pitch from the HMW coal tar. At different times during act 106, the mixture can include HMW coal tar, mesophase pitch, and $sCO_2$ if the HMW coal tar is not completely converted to mesophase pitch, or substantially only mesophase pitch and $sCO_2$ if substantially the HMW coal tar is converted to mesophase pitch.

The exposure of the coal tar, or other coal-derived precursor materials to the $sCO_2$ can allow for the formation of pitch including desired carbon product precursors, such as one or more specific aromatic precursor chemicals, at relatively high levels of purity. Advantageously, the formation of pitch including desired precursor molecules at high levels of purity can enable the processes described herein to be run or performed in a continuous reactor, further decreasing the cost of forming mesophase pitch from coal and the carbon products derived therefrom. For example, the mesophase pitch can comprise relatively high concentrations of asphaltenes or any other aromatic hydrocarbons.

In some examples, the mesophase pitch formed by the processes described herein can be used as a precursor to form allotropes of carbon including covalently bonded monolayers of carbon atoms arranged in hexagonal or aromatic structures. In some examples, the mesophase pitch formed by the processes described herein can be used as a precursor to produce carbon sheets that have delocalized $sp^2$ hybridized pi-bonding within the sheet. In some examples, mesophase pitch can be produced that includes properties that allow it to serve as a precursor for the easy and efficient formation of desired carbon products. As a result, the mesophase pitch including the desired component molecules at desired purities can allow for the formation of carbon products with desired properties. For example, mesophase pitch formed from coal by the processes described herein can be used to produce graphene or other carbon products that have thermal conductivities up to about 5300 W/m·K, that have electrical conductivities similar to conductivities achieved with electron tunneling, that have mechanical strengths over 100 gigapascals (GPa), that have moduli over 2 terapascals (TPa), and that can exhibit up to 20% elongation.

After exposing the HMW coal tar to the $sCO_2$, the pressure suddenly decreases, which causes the $sCO_2$ to leave (e.g., evaporate from) mixture. The $sCO_2$ removes the remaining low molecular weight species from the mixture which can allow the mesophase pitch formed during act 106 to be formed into carbon fibers, graphene, fullerenes, diamond, or any other carbon product as desired without first stabilizing the mesophase pitch. For example, the purpose of stabilizing the mesophase pitch is to remove the low molecular weight species from the mesophase pitch since such low molecular weight species can ultimately form coke or poor crystallization upon graphitization, resulting in poor carbon fiber quality.

In an embodiment, the mixture is formed into fibers during act 106. For example, the mixture can be disposed or formed in a chamber of an extruder. Examples of extruders that can be used in act 106 includes a high pressure pyrolysis type microcompounding reactor (HAAKE Minilab) utilizing twin screw recirculation reactor and/or a melt blown spinning apparatus. The mixture can be pushed towards a die of the extruder. When the mixture exits the die, the pressure suddenly decreases causing the $sCO_2$ to leave the mixture and forms the mesophase pitch and any remaining HMW coal tar into one or more fibers. Act 106 can allow mesophase pitch to be formed into fibers without the method 100 requiring a separate act of forming the mesophase pitch into fibers.

In an embodiment, act 106 can include performing a heat treatment on the HMW coal tar. The heat treatment can facilitate converting the HMW coal tar into mesophase pitch. The heat treatment can cause the formation of low molecular weight species then removed by the $sCO_2$. The heat treatment can include heating the HMW coal tar to a temperature of about 300° C. to about 350° C., about 325° C. to about 375° C., about 350° C. to about 400° C., about 375° C. to about 425° C., about 400° C. to about 450° C., about 425° C. to about 475° C., or about 450° C. to about 500° C. The heat treatment can be performed before, during, or after the $sCO_2$ is added to the HMW coal tar.

In one particular embodiment, act 106 includes placing at least some the quinolone soluble fraction (i.e., all of, a distilled portion of, or substantially only HMW coal tar extracted from the quinolone soluble fraction) provided from act 104 in a chamber of an extruder. The extruder can mix the quinolone soluble fraction with the $sCO_2$ at elevated pressures. The extruder can also heat treat the quinolone soluble fraction. The extruder can then hot extrude the material. As the material leaves the extruder, the $sCO_2$ solvent evaporates and removes at least some of the low molecular weight species, such as the low molecular weight species generated during the heat treatment. It is during this method where stabilization can occur. Stabilization practices extrude and pull the fiber through a series of medium temperature (about 200° C. to about 300° C.) oxidation ovens. The purpose of conventional stabilization is to oxidatively remove residual low molecular weight species prior to graphitization. However, as previously discussed, the $sCO_2$ removes or otherwise expels the low molecular weight species upon exit from the die.

Further, the ejection of $sCO_2$ causes the mesophase pitch to exhibit a satisfactory softening point. For example, too much solvent with excessive low molecular weight species undesirably decreases the softening point of the mesophase pitch. However, by removing these lighter species and the solvent during act 106, the softening point of the mesophase pitch allows for direct carbonization of the mesophase pitch after the mesophase pitch is formed into fibers. Act 106 can avoid the costly fiber stabilization (as previously discussed) and energy intensive thermal methods to fractionate the solvent from the pitch during processing while avoiding time intensive aspects of liquid phase solvent based separations.

According to one exemplary embodiment, conventional microscopy-based imaging techniques can be used to evidence that $sCO_2$ spun fibers do not melt (fuse) during direct carbonization conditions. Conventional calorimetric techniques such as Differential Scanning calorimetry (DSC) or similarly with Differential Thermal Analyses (DTA) can also detect phase change (i.e., heat of fusion) should it occur.

The estimated 2011/2012 cost of carbon fiber production was ~$9.88/lb. About $1.50 of this cost is for stabilization and oxidation which can be avoided using the method 100. And due to use of mesophase pitch, it is expected that the cost of the graphitization step (currently $2.32/lb.) can also be decreased as the required growth of the graphitic phase is decreased and the time and energy input are also reduced. This represents nearly a third of the carbon fiber production cost.

It is noted that, in some embodiments, act 106 can be omitted from the method 100. For example, act 106 can be omitted from the method 100 when the HMW coal tar is formed into mesophase pitch using conventional methods.

Figure 3:
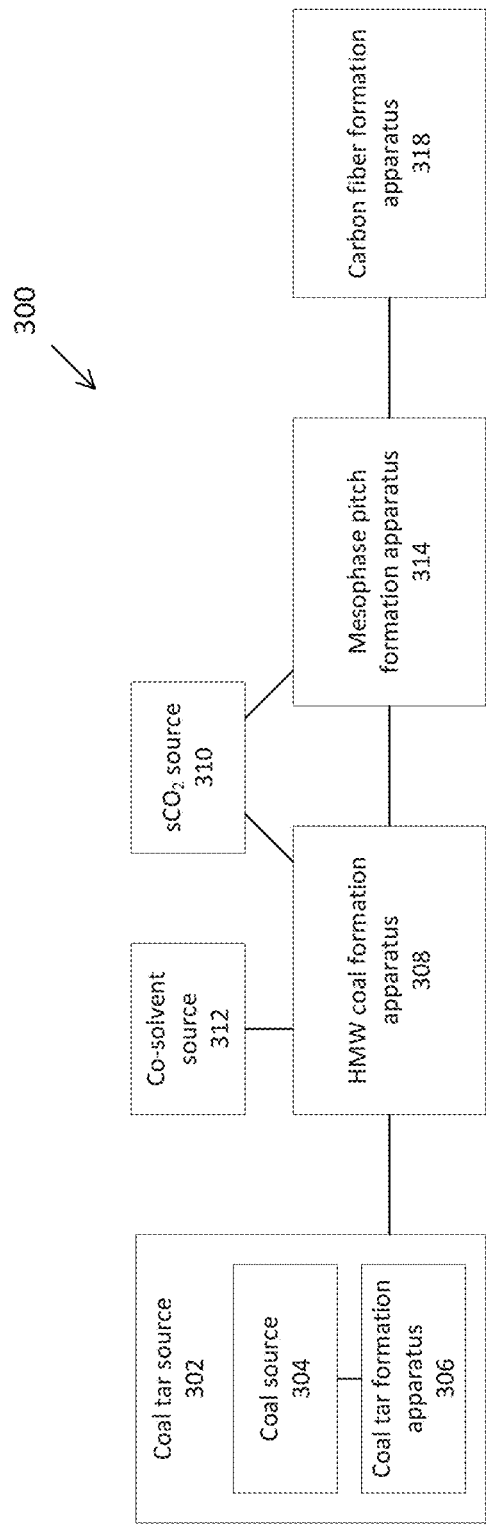
FIG. 3 shows a schematic diagram of a system for forming carbon fibers.

FIG. 3 is a schematic of a system 300 configured to form carbon fibers using the methods disclosed herein. The system 300 includes a coal tar source 302. The coal tar source 302 can be a container (e.g., hopper) that stores coal tar and/or can be configured to form the coal tar. When the coal tar source 302 is configured to form the coal tar, the coal tar source 302 can include a coal source 304 (e.g., hopper) and a coal tar formation apparatus 306 coupled to the coal source 304. The coal tar formation apparatus 306 is configured to form coal tar from the coal. The coal tar formation apparatus 306 can include at least one of a grinder to reduce the particle size of the coal, a sieve, a drier, a pyrolyzer, the system 200 illustrated in FIG. 2, or any other apparatus that can convert coal to coal tar.

The system 300 can also include a HMW coal tar formation apparatus 308 coupled to the coal tar source 302 so the HMW coal tar formation apparatus 308 can receive coal tar from the coal tar source 302. In one example, the HMW coal tar formation apparatus 308 is an SFE apparatus. In such an embodiment, the system 300 can include, and the HMW coal tar formation apparatus 308 can be coupled to, an $sCO_2$ source 310 and a co-solvent source 312 so the HMW coal tar formation apparatus 308 can receive $sCO_2$ and one or more co-solvents. The HMW coal tar formation apparatus 308 can include at least one of a mixing device configured to mix the $sCO_2$ and the co-solvent with the coal tar, a heater, and/or a pump configured to heat and pressurize the coal tar, one or more outlets configured to remove different constituents of the coal tar and the solvents therefrom, or any other suitable device or apparatus.

In one example, the HMW coal formation apparatus 308 can include one or more conventional apparatuses configured to remove contaminants from the coal tar to form HMW coal tar, such as an apparatus configured to merely use the co-solvents disclosed herein to remove the contaminants from the coal tar without using $sCO_2$. In such an embodiment, the HMW coal tar formation apparatus 308 can include a thermal treatment device or other device configured to remove the solvents from the HMW coal tar.

The system 300 can also include a mesophase pitch formation apparatus 314. The mesophase pitch formation apparatus 314 is coupled to the HMW coal tar formation apparatus 308 so the mesophase pitch formation apparatus 314 can receive HMW coal tar from the HMW coal tar formation apparatus 308. In one example, the mesophase pitch formation apparatus 314 is configured to form the mesophase pitch aided by $sCO_2$. In such an embodiment, the mesophase pitch formation apparatus 314 is coupled to the $sCO_2$ source 310. In one example, the mesophase pitch formation apparatus 314 is an extruder, such as a melt blown spinning apparatus. In an embodiment, the mesophase pitch formation apparatus 314 includes at least one of a heater configured to provide a heat treatment to the HMW coal tar, a pump, or other device configured to pressurize the HMW coal tar, a die, or a mixer configured to mix the HMW coal tar with the $sCO_2$.

The system 300 can also include a carbon fiber formation apparatus 316. The carbon fiber formation apparatus 316 can include any carbon fiber formation apparatus known in the art. In an embodiment, the carbon fiber formation apparatus 316 does not include one or more of a fiber formation device since the mesophase pitch formation apparatus 314 can form the mesophase pitch into one or more fibers, a stabilization device configured to stabilize the mesophase pitch since the mesophase pitch formation apparatus 314 can stabilize the mesophase pitch, or a graphitization device since the mesophase pitch provided by the mesophase pitch formation apparatus 314 may not require graphitization. In an embodiment, the carbon fiber formation apparatus 316 can include a carbonization device configured to carbonize the fibers to form carbon fibers and, optionally, one or more of a fiber formation device, a stabilization device, or a graphitization device.

In an embodiment, the carbon fiber formation apparatus 316 is an already existing conventional carbon fiber formation apparatus (e.g., an existing PAN fiber-fed plant). In such an embodiment, at least one of the coal tar source 302, the HMW coal tar formation apparatus 308, the $sCO_2$ source 310, the co-solvent source 312, or the mesophase pitch formation apparatus 314 are a bolt-on retrofit to the existing conventional carbon fiber formation apparatus. In other words, portions of the system 300 can directly fit in and potentially replace a large portion the front end of current carbon fiber formation/heat treatment systems. The system 300 can facilitate an integrated coal to fiber facility.

The system 300 can be located at mine mouth sites or industrial parks. Accordingly, Powder River Basin (PRB) carbon can be used in the system 300 since it is low in ash and sulfur, making it an ideal U.S. coal for forming carbon fiber. The system 300 can be configured so the small amounts of fuel gas co-products formed could be supplement to power generation. Synergistically, the locally produced power could be used in part for supplying high temperature electrically heated furnaces used in carbonizing and graphitizing the carbon fibers.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of forming high molecular weight ("HMW") coal tar, comprising:
   combining supercritical carbon dioxide ($sCO_2$) and an amount of coal tar;
   fractionating the amount of coal tar to form the HMW coal tar;
   converting the HMW coal tar into mesophase pitch by physically mixing the HMW coal tar with $sCO_2$ in a high pressure environment; and
   stabilizing the mesophase pitch by suddenly reducing pressure to cause the $sCO_2$ to leave the mixture.

2. The method of claim 1, further comprising forming the amount of coal tar from coal.

3. The method of claim 2, wherein forming the amount of coal tar from coal comprises extracting the coal tar from an amount of coal using $sCO_2$.

4. The method of claim 1, further comprising adding toluene to the coal tar.

5. The method of claim 4, wherein fractionating the amount of coal tar to form HMW coal tar comprises collecting a toluene insoluble fraction.

6. The method of claim 5, wherein fractionating the amount of coal tar to form HMW coal tar comprises rinsing the toluene insoluble fraction in toluene.

7. The method of claim 1, further comprising adding quinolone to the coal tar.

8. The method of claim 7, wherein:
fractionating the amount of coal tar to form HMW coal tar comprises collecting a quinolone soluble fraction; and
the method further comprises extracting the HMW coal tar from the quinolone soluble fraction.

9. The method of claim 1, further comprising combining one or more co-solvents with the amount of coal tar, wherein an amount of $sCO_2$, by weight, is greater than an amount of the one or more co-solvents.

10. The method of claim 1, wherein fractionating the amount of coal tar to form HMW coal tar comprises heating the coal tar to a temperature of between about 32° C. and about 700° C. and pressurizing the amount of coal tar to a pressure of between about 7.5 MPa and about 16 MPa.

* * * * *